United States Patent [19]

Hsu

[11] Patent Number: 6,151,424
[45] Date of Patent: Nov. 21, 2000

[54] SYSTEM FOR IDENTIFYING OBJECTS AND FEATURES IN AN IMAGE

[76] Inventor: Shin-yi Hsu, 2312 Hemlock La., Vestal, N.Y. 13850

[21] Appl. No.: 08/709,918

[22] Filed: Sep. 9, 1996

Related U.S. Application Data

[62] Division of application No. 08/234,767, Apr. 28, 1994, Pat. No. 5,640,468.

[51] Int. Cl.$^7$ ...................................................... G06K 9/36
[52] U.S. Cl. ............................................................ 382/294
[58] Field of Search ................................... 382/103, 173, 382/153, 155, 157, 181, 190, 199, 203, 240, 284, 285; 364/274.6; 395/61; 348/116–120, 122, 123

[56] References Cited

U.S. PATENT DOCUMENTS

| | | | |
|---|---|---|---|
| 5,144,685 | 9/1992 | Nasar et al. | 382/153 |
| 5,226,092 | 7/1993 | Chen | 382/157 |
| 5,579,444 | 11/1996 | Dalziel et al. | 382/153 |
| 5,631,970 | 5/1997 | Hsu | 382/203 |
| 5,640,468 | 6/1997 | Hsu | 382/190 |

Primary Examiner—Jose L. Couso
Attorney, Agent, or Firm—Salzman & Levy

[57] ABSTRACT

The present invention features the use of the fundamental concept of color perception and multi-level resolution to perform scene segmentation and object/feature extraction in the context of self-determining and self-calibration modes. The technique uses only a single image, instead of multiple images as the input to generate segmented images. Moreover, a flexible and arbitrary scheme is incorporated, rather than a fixed scheme of segmentation analysis. The process allows users to perform digital analysis using any appropriate means for object extraction after an image is segmented. First, an image is retrieved. The image is then transformed into at least two distinct bands. Each transformed image is then projected into a color domain or a multi-level resolution setting. A segmented image is then created from all of the transformed images. The segmented image is analyzed to identify objects. Object identification is achieved by matching a segmented region against an image library. A featureless library contains full shape, partial shape and real-world images in a dual library system. The depth contours and height-above-ground structural components constitute a dual library. Also provided is a mathematical model called a Parzen window-based statistical/neural network classifier, which forms an integral part of this featureless dual library object identification system. All images are considered three-dimensional. Laser radar based 3-D images represent a special case.

16 Claims, 10 Drawing Sheets

(4 of 10 Drawing Sheet(s) Filed in Color)

Figure 1
Figure 2

M704J3 → R 2
M705J3 → G 3  } M7J3FC
M706J3 → B 3

MJ04J3 Compressed  25 (3) R
                    50 (3) G
                    75 (2) B

SYSTEM FOR IDENTIFYING OBJECTS AND FEATURES IN AN IMAGE

This application is a division of 08/234,767 filed Apr. 28, 1994 now U.S. Pat. No. 5,640,468.

FIELD OF THE INVENTION

The present invention pertains to object and feature identification in an image and, more particularly, to scene segmentation and object/feature extraction by generating uniform regions from a single band image or a plurality thereof using a self-determining, self-calibrating, improved stable structure, pseudo multispectral color, and multilevel resolution processing technique, and associated matching methods for object identification.

BACKGROUND OF THE INVENTION

An image is basically a data matrix of m rows and n columns. An element of that image matrix is called a picture element, or a pixel. An image becomes meaningful when a user is able to partition the image into a number of recognizable regions that correspond to known natural features, such as rivers and forests, or to man-made objects. Once this higher-level of image generalization is completed, each distinct feature/object, being a uniform field, can be identified. The process by which such a uniform field is generated is generally referred to as segmentation. The process by which a segmented region is matched with a rule set or a model is referred to as identification.

Dozens of techniques have been used by researchers to perform image segmentation. They can be grouped into three major categories: (1) class-interval based segmentors, (2) edge-based segmentors, and (3) region-based segmentors.

A given image has 0 (zero) as the minimum pixel value and 255 as the maximum pixel value. By mapping all pixels whose intensity values are, say, between 0 and 20 into one category, a simple thresholding method can be used to perform image segmentation.

An edge is generally defined as the difference between adjacent pixels. Edge-based image segmentation is performed by generating an edge map and linking the edge pixels to form a closed contour. A review of this class of segmentors can be obtained from Farag. (*Remote Sensing Reviews,* Vol. 6, No. 1–4, 1992, pp. 95–121.)

Region-based segmentation reverses the process of edge-based segmentation, because it starts with the interior of a potential uniform field rather than with its outer boundary. The process generally begins with two adjacent pixels and one or more rules used to decide whether merging of these two candidates should occur. One of the examples of this class of segmentors can be found in Tenorio using a Markov random field approach. (*Remote Sensing Reviews,* Vol. 6, No. 1–4, 1992, pp. 141–153.)

All conventional segmentors share the following fundamental features:

1) the segmentation process is generally performed on a single band image;
2) the segmentation process follows well-defined mathematical decision rules;
3) except for simple thresholding, all segmentors are computationally expensive and/or intensive; and
4) none of the conventional techniques is self-determining or self-calibrating.

If segmentation is defined as the process of generating distinct uniform fields from a scene, a human visual system that is based on color perception should also be considered a segmenter. In contrast to mathematics-based segmentation schemes, color-based segmentation relies on the use of three spectrally-derived images. These multiple images are, in most cases, generated from a physical device called a multispectral sensor. The advantage of this method over mathematical segmentors is its ability to perform scene segmentation with minimal or no mathematical computation.

For purposes of clarity throughout this discussion, it should be understood that the concept of three spectrally-derived (color) images, while representing the preferred embodiment, is merely a subset of a more general concept: any composite having component ranges which may be transformed into two or more respective component parts and then projected into a common space.

Color-based segmentors require input of three spectrally distinct bands or colors. A true color picture can be generated from a scene taken by three registered bands in the spectral regions of blue, green and red, respectively. Then, they are combined into a composite image using three color filters: red, green and blue. The resultant color scene is indeed a segmented scene because each color can represent a uniform field.

The above discussion is related to region-based segmentation. In edge-based segmentation, all of the conventional techniques use well-defined mathematical formulae to define an edge. After edges are extracted, another set of mathematical rules is used to join edges and/or eliminate edges in order to generate a closed contour to define a uniform region. In other words, none of the conventional techniques uses the scene itself to define an edge even though, in a more global point of view, an edge is, in fact, defined by the scene itself.

If a region or an edge can be generated from the content of the scene itself, it should be possible to integrate both region-based and edge-based segmentation methods into a single, integrated process rather than using two opposing philosophies.

Object identification is a subsequent action after segmentation to label an object using commonly-accepted object names, such as a river, a forest or an M-60 tank. While object recognition can be achieved from a variety of approaches (such as statistical document functions and rule-based and model-based matching), all of these conventional methods require extracting representative features as an intermediate step toward the final object identification. The extracted features can be spectral reflectance-based, texture-based and shape-based. Statistical pattern recognition is a subset of standard multivariable statistical methods and thus does not require further discussion. A rule-based recognition scheme is a subset of conventional, artificial intelligence (AI) methods that enjoyed popularity during the late 1980s. Shape analysis is a subset of model-based approaches that requires extraction of object features from the boundary contour or a set of depth contours. Sophisticated features include Fourier descriptors and moments. The effectiveness of depth information was compared to boundary-only based information, Wang, Gorman and Kuhl (*Remote Sensing Reviews,* Vol. 6, No. 1–4, pp. 129+). In addition, the classifier performance between range moments and Fourier descriptors was contrasted.

An object is identified when a match is found between an observed object and a calibration sample. A set of calibration samples constitutes a (calibration) library. A conventional object library has two distinct characteristics: 1) it is feature based and 2) it is full-shape based. The present invention reflects a drastically different approach to object identification because it does not require feature extraction as an intermediate step toward recognition and it can handle partially-occluded objects.

Feature extraction uses fewer but effective (representative) attributes to characterize an object. While it has the advantage of economics in computing, it runs the risk of selecting wrong features and using incomplete information sets in the recognition process. A full-shape model assumes that the object is not contaminated by noise and/or obscured by ground clutter. This assumption, unfortunately, rarely corresponds to real-world sensing conditions.

Depth contours are used for matching three-dimensional (3-D) objects generated from a laser radar with 3-D models generated from wireframe models. In real-world conditions, any image is a 3-D image because the intensity values of the image constitute the third dimension of a generalized image. The difference between a laser radar based image and a general spectral-based image is that the former has a well-defined third dimension and the latter does not.

It has been proven that the majority of objective discrimination comes from the boundary contour, not the depth contour (Wang, Gorman and Kuhl, *Remote Sensing Review*, Vol. 6, Nos. 1–4, pp. 129–?, 1992(?)). Therefore, the present invention uses a generalized 3-D representation scheme to accommodate the general image. This is accomplished by using the height above the ground (called height library) as an additional library to the existing depth library. The resultant library is called a dual depth and height library.

It would be advantageous to provide a much simpler, more effective and more efficient process for image segmentation, one that achieves an integration between region-based and edge-based segmentation methodologies which, heretofore, have been treated as mutually exclusive processes.

It would also be advantageous to generate uniform regions of an image so that objects and features could be extracted therefrom.

It would also be advantageous to provide a method for segmenting an image with minimal mathematical computation and without requiring two or more spectrally-derived images.

It would also be advantageous to provide a flexible and arbitrary scheme to generate colors.

It would also be advantageous to use the human phenomenon of color perception to perform scene segmentation on only one spectral band.

It would be advantageous to provide an object identification scheme that does not rely on a predetermined number of features and fixed characteristics of features.

It would also be advantageous to provide an object identification scheme to facilitate object matching either in a full-shape or partial-shape condition.

It would also be advantageous to provide an object identification system that is both featureless and full and partial shape based.

It would also be advantageous to provide a mathematical model that can handle both featureless and full/partial shape cases.

It would also be advantageous to provide a library construction scheme that is adaptable to both featureless and full/partial shape based object recognition scenarios.

It would also be advantageous to provide a dual library (depth and height) to perform general 3-D object recognition using any type of image.

It would also be advantageous to provide a full object identification system that is capable of integrating the previously described novel segmentation and novel object recognition subsystems.

SUMMARY OF THE INVENTION

In accordance with the present invention, there is provided a Geographical Information System (GIS) processor to perform scene segmentation and object/feature extraction. GIS has been called a collection of computer hardware, software, geographical data and personnel designed to efficiently manipulate, analyze, and display all forms of geographically referenced information. The invention features the use of the fundamental concept of color perception and multi-level resolution in self-determining and self-calibration modes. The technique uses only a single image, instead of multiple images as the input to generate segmented images. Moreover, a flexible and arbitrary scheme is incorporated, rather than a fixed scheme of segmentation analysis. The process allows users to perform digital analysis using any appropriate means for object extraction after an image is segmented. First, an image is retrieved. The image is then transformed into at least two distinct bands. Each transformed image is then projected into a color domain or a multi-level resolution setting. A segmented image is then created from all of the transformed images. The segmented image is analyzed to identify objects. Object identification is achieved by matching a segmented region against an image library. A featureless library contains full shape, partial shape and real-world images in a dual library system. The depth contours and height-above-ground structural components constitute a dual library. Also provided is a mathematical model called a Parzen window-based statistical/neural network classifier, which forms an integral part of this featureless dual library object identification system. All images are considered three-dimensional. Laser radar based 3-D images represent a special case.

Analogous to transforming a single image into multiple bands for segmentation would be to generate multiple resolutions from one image and then to combine such resolutions together to achieve the extraction of uniform regions. Object extraction is achieved by comparing the original image and a reconstructed image based on the reduced-resolution image. The reconstruction is achieved by doubling the pixel element in both x and y directions. Edge extraction is accomplished by performing a simple comparison between the original image and the reconstructed image. This segmentation scheme becomes more complex when two or more sets of pair-wise comparisons are made and combined together to derive the final segmentation map. This integration scheme is based on mathematical morphology in the context of conditional probability.

To accommodate featureless and full/partial shape based object identification, the present invention proposes the use of a mixture of full-shape and partial-shape models plus real-world images as a calibration library for matching against the segmented real-world images. Moreover, in accordance with the invention, the library is constructed in the image domain so that features need not be extracted and real-world images can be added freely to the library. The invention further provides a mathematical model for the classifier using the Parzen window approach.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A complete understanding of the present invention may be obtained by reference to the accompanying drawings, when considered in conjunction with the subsequent detailed description, in which:

FIG. 1 is a monochrome original image;

FIG. 2 is a bit-reduced and reconstituted image. (of FIG. 1) without compression, based on three identical bands, in accordance with the present invention;

DESCRIPTION OF THE PREFERRED EMBODIMENT

In conventional multispectral images, an object emits or radiates electromagnetic radiation when its temperature is above 0° K. The radiation can be divided into numerous subsets according to any specified wavelength intervals. A conventional color photograph is a composite of three broad wavelength intervals: red from 0.6 to 0.7 micron; green from 0.5 to 0.6 micron; and blue from 0.4 to 0.5 micron. Using any three wavelength regions other than the aforementioned red/green/blue combination yields a set of colors that differs significantly from the set produced by blue, green and red spectral regions. All such deviations are called false colors. It follows that any three bands can generate false colors. The human-perceived true color set is a special case.

Reducing the interval between adjacent wavelength regions results in two images being very similar. Since any wavelength regions can be used selectively to generate multispectral images, generation of false-color images can be a random process. The present invention reflects the discovery that false color images can be generated from a single band image.

Figure 6:
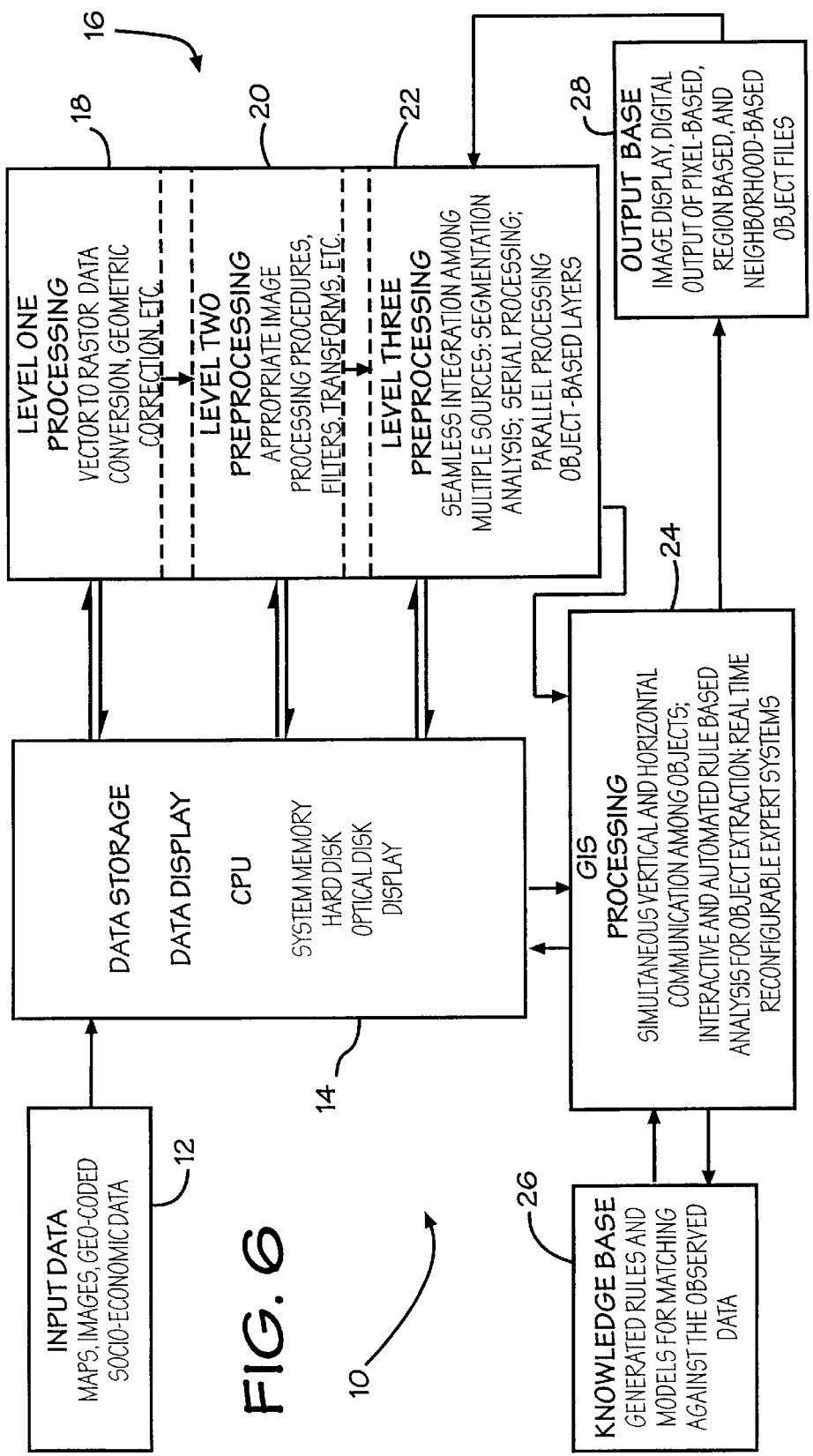
FIG. 6 is a block diagram depicting the multi-level preprocessing functions incorporated in the invention.

Referring now to the FIGURES, and specifically to FIG. 6, there is shown a functional block diagram of the preprocessing technique that is the subject of copending patent application Ser. No. 08/066,691, filed May 21, 1993.

The first component of the system is means for accepting various information sources as input to a second-generation GIS system, shown at reference numeral 12. The system accepts multiple data sources 12 for one common geographical area. The sources can be existing maps, geo-coded, socio-economic data such as census tracts, and various images such as LANDSAT and SPOT satellite imagery. The most common information sources are images and maps. This component 12 allows all data to conform to a common format: a layer of information is equivalent to a data matrix.

The input data 12 is applied to a data storage device, such as a system memory, a hard disk, or an optical disk, and/or to one or more conventional display devices, both storage and display devices being represented by reference numeral 14. Disks and memory 14 are used for efficient storage and retrieval.

All of the appropriate image processing and remote sensing analysis techniques can be used as preprocessors, shown generally as reference numeral 16, but consisting of a first, second and third preprocessor 18, 20 and 22 to the main GIS system processor 24, which performs the above-discussed GIS-based image analysis. Preprocessing transforms the incoming observed data into a format in which objects are readily extractable. If images are properly aligned, however, preprocessing levels 1 and 2 need not be performed at all.

If the images are "raw", of course, preprocessing is required. The level 1 preprocessor 18 is used to convert vector data to image (raster) data, to correct geometric and spectral errors, to perform resolution matching, to zoom, rotate and scale (so as to align the separate images with one another), and to filter and transform images, if necessary.

The level 2 preprocessor 20 is used for edge detection, special purpose feature separation, linear combination and multi-resolution functions. Image data must be preprocessed to the point that objects are readily extractable by the main processor. While the majority of level 2 preprocessing is to be performed using the segmenter of the main system, external system processors, not shown, can be used to perform similar functions.

A multi-level resolution analysis method is used to define edges and then extract edge-based objects. The level 2 preprocessor 20 provides the main processor 24 with a binary image. Background of zero intensity value is used to represent non-edge based object, and 255 to represent objects of strong edgeness.

The third level preprocessor 22 can be conceived as a "clearing house" for all incoming data. Regions are processed in such a way as to generate a scene structure. Once all of the data sets are processed, each individual region in any layer can communicate with any other region in any layer. While many methods are available to provide this function, the inventive system uses an object-based segmentation scheme to generate regions for each individual layer. Each region is given a set of feature attributes which includes spectral intensity, size/shape/texture information of the region, and locational information of the centroid and the individual pixels in the region.

The object extraction system discussed above is a seamless integration between raster image processing and vector GIS processing, heretofore not achieved by other researchers.

One or more rules are used to interrogate the attribute database. The main system 110 accepts any appropriate means for object identification, as long as it uses the regions generated by level 3 preprocessor 108 as the basis of information analysis.

The invention provides an environment for parallel processing in the level 3 preprocessor 22 and the main processor 24. In the preferred embodiment, the program is written for a parallel processor manufactured by the Transputer Company, but it should be understood that any appropriate parallel hardware/software system can be used. Parallel processing is not a required feature of a GIS system, but it has been found to be a desirable feature for any information extraction system.

Connected to GIS processor 24 are a set of self-determining and self-calibrating segmentation schemes and an image library comprising a mixture of model-based images and real-world images, known as a knowledge base or library 26 and an output base 28, both described in greater detail hereinbelow.

In operation, a single, monochrome, original image (FIG. 1) is input to the GIS processor 24 (FIG. 6) as data 12 or as a level 2 preprocessed image 20, and then transformed into two or more pseudo bands using various compression methods. Such compression methods include, but are not limited to, taking a square root or applying compression factors from a general logarithm transformation. A false color image, therefore, can be generated, for example, from the following three transforms of a single image: (1) square root; (2) log; and (3) double log.

A distinct feature of the present invention is a flexible color generation scheme. The above-described transformation scheme is essentially a data compression procedure. False color generation is an arbitrary method. Thus, a generalized data compression scheme can be devised in accordance with the concept of the logarithm. For instance, a compression factor of 10 can be selected as the equivalent of taking a square-root transform. Similarly, a compression factor of 100 can be selected as the equivalent of taking a single log transform.

The user is therefore able to select a simple number to generate a new image. Accordingly, generation of a false color image based on three bands becomes a simple procedure based on selection of three numbers (e.g., 25, 50 and 100).

Table I contains an example of compression factors. These factors were generated by a generalized log scale of 75. Each pixel value between 0 and 255 is mapped and transformed by its appropriate compression factor (value), so that an original image having up to 256 pixel values can be represented as a transformed image of no more than 18 pixel values.

TABLE I

Single Image Transformations
Transformation (increases left to right, then down)

| 0 | 0 | 0 | 0 | 4 | 4 | 36 | 37 | 37 | 41 | 41 | 41 | 41 | 41 | 73 |
|---|---|---|---|---|---|----|----|----|----|----|----|----|----|----|
| 73 | 73 | 77 | 77 | 77 | 77 | 77 | 77 | 77 | 109 | 109 | 110 | 110 | 110 | 110 |
| 114 | 114 | 114 | 114 | 114 | 114 | 114 | 114 | 114 | 114 | 114 | 146 | 146 | 146 | 146 |
| 146 | 146 | 146 | 146 | 146 | 146 | 146 | 150 | 150 | 150 | 150 | 150 | 150 | 150 | 150 |
| 150 | 150 | 150 | 150 | 150 | 182 | 182 | 182 | 182 | 182 | 182 | 182 | 182 | 182 | 182 |
| 182 | 182 | 182 | 182 | 182 | 183 | 183 | 183 | 183 | 183 | 183 | 183 | 183 | 183 | 187 |
| 187 | 187 | 187 | 187 | 187 | 187 | 187 | 187 | 187 | 187 | 187 | 187 | 187 | 219 | 219 |
| 219 | 219 | 219 | 219 | 219 | 219 | 219 | 219 | 219 | 219 | 219 | 219 | 219 | 219 | 219 |
| 219 | 219 | 219 | 219 | 219 | 219 | 219 | 219 | 219 | 219 | 219 | 219 | 219 | 219 | 219 |
| 219 | 219 | 219 | 219 | 219 | 219 | 219 | 219 | 219 | 219 | 219 | 129 | 223 | 223 | 223 |
| 223 | 223 | 223 | 223 | 223 | 223 | 223 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |

A false color composite image can be generated using a conventional bit mapping scheme (FIGS. 8a and 8b), such as the one shown below.

1. Code any number of bits from a square root transformed band 50 (FIG. 8b) as one of the primary colors (red, green or blue). Example: color three bits in the red band.
2. Code any number of bits from a log-transformed band 50 as one of the two remaining primary colors. Example: color three bits in the green band.
3. Code any number of bits from a double-log transformed band as the last remaining primary color. Example: color two bits in the blue band.
4. Combine the above three bands 52 into a composite image 54 and display it 56 on a color monitor, not shown. (This step is identical to the conventional color image generation procedure.)
5. Digitally capture the displayed color composite image 58.
6. Store the digital image 58 in memory or a data storage device (e.g., a hard disk), for subsequent segmentation and object/feature extraction analysis.

The resultant image is shown in FIG. 2.

The color image generation procedure differs significantly from conventional procedures because the latter relies on the availability of three images, each of which corresponds precisely to a given wavelength region.

In other words, conventional color image generation techniques must have multiple, original images, whereas the present invention requires only one image.

Another distinct feature of the present invention is real time segmentation from a single band source. As previously noted, conventional segmentation procedures are extremely time consuming because sophisticated segmentors require intensive computations in finding edges and/or merging regions. As a significant departure, however, the present invention requires no computations beyond compression to perform image segmentation. The inventive method uses a color to represent a region. That color can be generated from the merger of three bands in the color domain using a lookup table (Table I) procedure, rather than numerical computations or logic statement decisions.

Segmentation is a method for partitioning an image into a number of uniform regions. It follows that a color representation of the original image is a segmented image. Two simple and appropriate segmentation schemes can be used to perform segmentation based on the present invention.

The first method is simple thresholding. Zero can be specified as a class by itself; or an interval, say, from one to five can represent another class. This simple and yet extremely effective segmentation scheme is made possible because the image is already segmented in the color domain. Each color is represented by a digital number or by a class interval.

Two initial segmentation algorithms, LOCAL and GLOBAL, having much in common, are discussed herein simultaneously.

Segmentation starts at the upper left pixel (which defines the first region) and proceeds from left to right across each row. When a row is complete, the next row down is processed.

When the region affiliation of a pixel is to be determined, the pixel above it and to the left are considered. One of four possibilities will result:

1) The pixel will define a new region.
2) It will merge into the region of the pixel above.
3) It will merge into the region of the pixel to its left.
4) The region of the pixel above and the region to its left will be merged into one grand region, with this pixel being included.

Diagonal tone values are never considered and diagonal merging is not a possibility.

The following algorithm description refers to pixels above and to the left of the current pixel. Obviously, the top row will have none above and the left column will have none to the left. The algorithm interprets such cases as "exceeding the threshold." In other words, pixels outside the frame are assumed to have infinitely different tone, with the result that a boundary is always generated around the image. In the case of GLOBAL segmentation, the following description refers to "changing the tone" of pixels. It should be understood that this change is temporary and in effect only for the duration of initial segmentation. All pixels revert to their original, true values after initial segmentation is complete. Initial segmentation is performed as follows:

1) Initialize the first region to be the upper left pixel. Go on to the next pixel to the right, which will be called the "current pixel".
2) Examine the tone difference between the current pixel and the (possibly revised) tones of the pixel above it and the pixel to the left of it. Compare these differences to a predetermined threshold.
3) If both tone differences exceed the threshold, the current pixel generates a new region.
4) If exactly one tone difference is less than or equal to the threshold, absorb the current pixel into the region to which that neighbor belongs. If GLOBAL segmentation is being performed, change the tone of the current pixel to the tone of that region.
5) If both tone differences are less than or equal to the threshold, absorb both the current pixel and whichever of the two regions was most recently created into the older region. If GLOBAL segmentation is being performed, change the tone of the current pixel and of all pixels in the most recent region to the tone of the older region.

In step no. 5 (above) of the initial segmentation, merging the region of the pixel above with that of the pixel to the left is not a trivial undertaking. Passing through the entire frame, reclassifying perhaps thousands of pixels, would be terribly time consuming. Therefore, a group map vector is maintained. Each member of this array is the "true" region membership of the region corresponding to that position in the array. Thus, suppose that the fifth element of this vector is equal to three. That means that pixels formerly considered to belong to region five are now considered to belong to region three. In this way, updating regions to reflect merger involves updating only this relatively small group map vector, rather than the entire image as segmented so far.

The initial segmentation steps are next illustrated with code fragments extracted directly from the source module SEG_GLOB.C, the GLOBAL segmenter. The LOCAL segmenter is essentially identical except that tones are never changed to group leaders.

The image is stored as a vector. The first row is first, followed by subsequent rows. Therefore, the pixel to the left of the current pixel has a subscript one less than that of the current pixel. The pixel above has a subscript ncols less. For example, the tone of the current pixel is compared to those of the pixel to the left and the pixel above, as follows:

```
if (abs ( (int) + pix_ptr – (int) + (pix_ptr–1)) > cut)        /+Left+/
if (abs ( (int) + pix_ptr – (int) + (pix_ptr-ncols)) > cut)    /+Above+/
```

If both of the differences exceed the threshold, a new group (region) is processed. First, increment the region counter and verify that the memory allocated for storing region information has not been exceeded. Second, set the group pointer for this pixel equal to the number of the new group (region). Finally, set the group mapping pointer to be this group. In other words, it has its own identity and has not yet been absorbed into another region.

```
if (++ngps > maxgrps)
    goto EXIT;
+grp_ptr++ = ngps;        /+Group ID for this pixel+/
grpmap[ngps] = ngps;      /+Group map vector+/
```

If the tone difference with the pixel above does not exceed the threshold, but the tone difference to the left does, this pixel is merged into the region above. This is done by changing the group ID of this pixel to that of the pixel above. Furthermore, if this is GLOBAL merging, the tone of this pixel must be changed to that of the pixel above.

```
+grp_ptr = +(grp_ptr-ncols);    /+No top edge so merge up+/
++grp_ptr;                       /+Point to next pixel+/
+pix_ptr = +(pix_ptr-ncols);    /+Propagate leader tone+/
```

If the tone difference with the pixel in the left does not exceed the threshold, but the tone difference above does exceed the threshold, merge this pixel into the region to the left. The steps are similar to the previous case.

```
+grp_ptr = +(grp_ptr–1);    /+No left edge so merge left+/
++grp_ptr;                   /+Point to next pixel+/
+pix_ptr = +(pix_ptr–1);    /+Propagate leader tone+/
```

The last case is the most difficult. When both tone differences do not exceed the threshold, the region above and the region to the left merge with each other, due to the current pixel. The most recently created region is absorbed into the older region, regardless of which is above and which to the left. This is an arbitrary decision, as either 0choice (or even a random choice) could be possible. However, absorbing the younger into the older speeds the remapping process, described below, by limiting the number of regions that must be checked. The first step is therefore to find the older region (the smaller region number) and the younger. In GLOBAL segmentation, the new region's tone is that of the absorbing group.

```
small = grpmap[+(grp_ptr-ncols)];   /*Most likely order+/
big = grpmap[+(grp_ptr + 1)];
if (big < SMALL) |                  /*but not guaranteed+/
    temp = big;
    big = small;
    small = temp;
    leader = +(pix_ptr-1);          /*Propagate leader tone+/
    |
else
    leader = +(pix_ptr-ncols);
```

This pixel is classified as belonging to the "small" region. For GLOBAL segmentation, change its tone to that of the new region. The pixels above and to the left should both be in the same region already, so nothing else need be done.

```
+grp_ptr++ = small;      /*This pixel's region number+/
+pix_ptr = leader;       /*Propagate leader tone+/
If (big == small)        /*If above and left groups same, done+/
    continue;
```

If this is GLOBAL segmentation, the tone of the "big" group's pixels must be changed to the tone of the new region. There is no need to process all of the pixels in the image processed so far. Only the pixels in the row above, to the right of the current pixel, and those in the row to the left of the current pixel can affect future decisions.

c = ncols · col + 1; /*This row, to left of current pixel+/
while (++C)
  if (grpmap[+(grp_ptr-c-1)] == big)
    +(pix_ptr-c) = leader;
c = col; /*And along row above which remains+/
while (−−C)
  if (grpmap[+(grp_ptr-ncols-1+c)] == big)
    +(pix_ptr-ncols+c) = leader;

The final step in dealing with the merging of two established regions is to update the group mapping vector to reflect the fact of the absorption. This loop requires is the most time in this algorithm. As each new region is defined, grpmap[ng]=ng is initialized, and the updating never increases the value of any element of grpmap. Thus it is guaranteed that grpmap[k]<=k.

for (temp=big; temp<=ngps; temp++)
  if (grpmap[temp] == big)
    grpmap[temp] = small;

After processing every pixel in the image as described above, the resulting group map vector is filled with holes. Absorption is not reversible. Every region number that was absorbed is an unused number, so the empty spaces must be compressed.

The algorithm for compressing the empty spaces is straightforward. Pass through the entire group map vector. When an element is found whose value is not equal to its subscript, it is a compressed-out region. That is, the region of the subscript was absorbed into the region of the value. To complete compression, increment a counter of zapped regions, place the counter in a vector called omit_grp in such a way that omit_grp[ig] is the number of regions up to that point that have been absorbed and reassign region numbers in grpmap by subtracting the corresponding element of omit_grp. The code for doing this is as follows:

```
count = 0;
for (ig = 1; ig <= ngps; ig++) |
    if (grpmap[ig] 1 = ig) /*if this group has been absorbed+/
        ++count;           /*then count it+/
    omit_grp[ig] = count;
    grpmap[ig] = omit_grp[grpmap[ig]] /*Compress+/
    |
```

The final step is to remap all of the pixels in the image according to the final group map. This is easily accomplished as follows:
  temp = nrows+ ncols;
  while (temp−−)
    idptr[temp] = grpmap[idptr[temp]];

The core algorithm is extremely similar to the LOCAL initial segmentation. The image is passed through the same way, examining pixels above and to the left of the current pixels. The only difference is that tones of pixels are not compared as in the initial segmentation. Rather, region IDs are examined and the merging criterion checked. If both of a pair of pixels belong to the same region, there is obviously no border between them. If they are in different regions the criterion must be evaluated. If there is a tone difference, subtract their mean tones and compare this to the cutoff. If the criterion is size-based, determine whether their sizes fit the criterion, and so forth. Otherwise, the core algorithm of region growing is identical to LOCAL, initial segmentation. Mean tones and sizes are not updated as merging takes place during the top-to-bottom operation. All merging decisions are based on the regions as they exist at the beginning.

A slight complication occurs when four regions are lined up and their mean tones are 50, 60, 48, 58. Letting the cutoff be 10, the first two will be merged as will the last two. When the top-to-bottom pass is completed, one new region will have a mean tone of 55 and the other will have a mean of 53. These two new regions certainly meet the merging criterion. Thus, another top-to bottom pass, cleaning up the newly-created regions that meet the current criterion, is performed and repeated until no more mergers take place. This iteration is important to ensuring stability across similar images.

The second method is a simple region-growing method. Neighboring pixels can be merged together if their absolute difference is zero or within a specified number. This one-pass region-growing segmentation yields a segmentation map that corresponds to a visual segmentation of the color map.

The overall scene characteristics (SC) profile is a sloping L-shaped curve with three distinct segments: 1) a steep slope indicating the fast merging of interior pixels; 2) a gentle slope indicating a slower rate of merging among objects and features; and 3) an "inflection" point between these two segments indicating the emergence of the object sets in segmentation analyses. Since real-world objects and features now exist as distinct subsets, they cannot be easily merged by linearly increasing cutoff values. The scene structure is, therefore, very stable, and thus called a stable structure, or optimal segmentation of the scene.

From the foregoing, it is clear that if a set of algorithms is available to perform such multistage segmentations with the cutoff value increasing linearly from one iteration to the next, a scene characteristics profile can be generated as described above. The stable structure of the scene can be analytically determined by identifying and analyzing the inflection point within the curve. (In this context the term inflection point does not have the rigid meaning of changing slope characteristics from a convex to a concave structure, but signifies a marked change in the magnitude of the slope from one section of curve to the next.) The effort is based precisely on the fact that this task-generation of stable structures of the scene can be accomplished with a set of artificial intelligence (AI)-based algorithms.

It should be understood that the scene characerics curve may itself be transformed (e.g., log, square root) in any combination or derivative form without departing from the scope of the present invention. Similarly, the stopping points for processing can be obtained by a simple criterion (e.g., slope change >1.0) or by combining suitable criteria of multiple curves.

Object Extraction Using Segmented Images

In the conventional approach, once the color image is digitally segmented, each region can be described by a set of feature attributes using size, shape and locational descriptors. An object is extracted if the given attributes match a model specified in an expert system.

An innovative approach of the present invention is to use a single-color (also known as "single band") or a single-feature-based image as the basis for generating additional objects. Once an image is represented by a set of colors, a series of images can be generated, each of which images is represented by a given color. For instance, if a color or a number corresponds to certain material that is used to build a road, then all of the road pixels (or similar pixels) can be extracted and implanted onto another image whose background is filled with zero values. When this road or similar-class map is isolated, region growing or other mathematical operations can be performed such as buffering or connecting broken components to generate new images.

An analogy to segmentation using multiple bands derived from a single band in a color domain is segmentation using multiple resolution from a single image.

Multi-level resolutions can be generated from a single image by a down sampling technique (such as generating a new, reduced-size image by mapping every other point into a new matrix). Using the newly created image as the basis for generating another down-sampled image, another lower resolution image of the original scene is obtained.

Self-determining and self-calibrating edges are a result of expanding the reduced-resolution image to a full-size image by doubling a pixel in both x and y directions and then subtracting the original matrix from the newly expanded matrix.

By generating three additional levels of resolutions from one scene, three sets of edge-based images can be obtained, each of which images is generated from two adjacent varying-resolution image pairs.

Once it is determined that edge-based pixels can be generated from an image by applying the above-discussed down-sampling expansion and matrix subtraction process, additional (third-generation) edge-pixel based images can be generated from the second-generation (edge-pixel based) images.

All of the edge-based images can be expanded to a full-resolution image by multiplying a factor of 2, 4, 16, . . . , respectively, in both x and y directions.

An edge-pixel based image is a general image composed of pixels of varying intensity values; therefore, a simple thresholding operation can be performed either to retain or to eliminate certain pixels. In general, only strong edges are retained in order to generate objects that have strong contrasts against the background.

An object is generally represented by a uniform region. While the above-discussed methodology begins with edge extraction, the end result can be expressed in terms of a region. This is particularly obvious when an object is a point feature or a linear feature, rather than a large-size area feature. In order to make the edge-based pixels correspond to the area base of a real-world object, certain spatial, morphological operations can be applied to the edge-based images. The following are examples of object generation by creating regions from the edge-based pixels using spatial morphological processors:

a) Binary Image Generation: Generating a binary image from a greytone image can be achieved by performing a simple thresholding operation. For instance, after weak edge points are eliminated, the values of all pixels whose intensity values are greater than zero can be changed into a value of 255 (black).

b) Connected Components Identification: On the binary image, an operation can be performed to merge all contiguous pixels to become one uniform region; then the resultant discrete regions can be labeled using a region identification code.

c) Feature Attributes Generation for Each Region:

After a region is generated, a set of feature attributes can be generated to describe the size, shape and location of the region.

d) Connecting Individual Regions: In certain cases, two or more individual regions are separated by a short distance but must be connected to form one uniform region. For this, a mathematical morphological operation is performed using a rectangle centered on each pixel to extend its spatial base to connect spatially separated regions.

e) Chopping a Region into a Number of Disconnected Regions: A region can be chopped into a number of spatially separated regions. In general, separation is made to occur at the location where the width is small.

f) Edge Cleaning and Filling: Once a region is determined, a smoothing operation can be performed on the boundary contour while simultaneously filling the missing pixels.

g) Buffering: A buffering operation creates an outer boundary paralleling the existing boundary contour.

Another innovative approach of the present invention is using newly-generated images, described above, to extract additional objects from the original image. The newly-created image can be used as an input to the original segmentation analysis, creating an additional information layer to perform object extraction. For instance, if a river has been labeled from the single feature image and a buffer around the river is generated around the river boundary contour, the buffer can be used to infer that a given object is located within a predetermined distance from the river bank. As shown in FIG. 8d, a river (black) has a thin-outline buffer zone in cyan.

The present invention is a process by which first a single-based image is segmented in the color domain that requires an input of two or more related bands; second, a color composite, generated from the multiple bands, is used as the basis for real-time segmentation; and third, intelligent object extraction is performed by using an image that is generated from a single-color represented feature.

As stated hereinabove, for purposes of clarity throughout this discussion, it should be understood that the concept of three spectrally-derived (color) images, while representing the preferred embodiment, is merely a subset of a more general concept: any composite having component ranges which may be transformed into two or more respective component parts and then projected into a common space.

Figure 3:
FIG. 3 is a multispectral original image.
Figure 4:
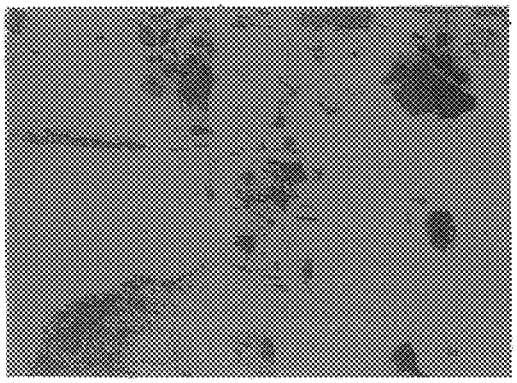
FIG. 4 is a compressed-transformed version of FIG. 3 with compression in accordance with the present invention.
Figure 5:
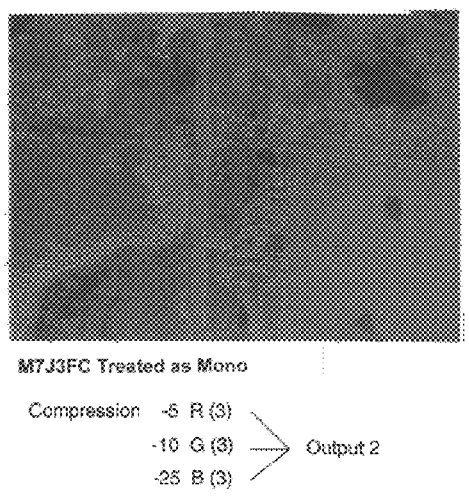
FIG. 5 is a compressed-transformed, three-band, monochrome, reconstituted version of FIG. 3.
Figure 9:
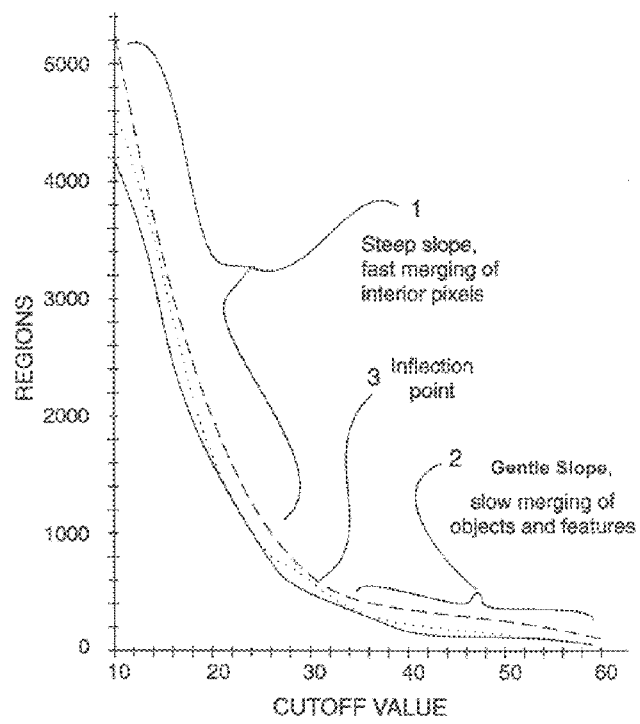
FIG. 9 is a typical scene characterics (SC) curve.

The process can best be understood with reference to the FIGURES. The input components accept one single image (FIG. 1) or multiple images that can be combined to generate a single image (FIG. 3), as the input. The input image(s) is stored in the memory or a physical device such as a hard disk or an optical disk.

Any composite having component ranges (e.g., color) break (transform) into three (3) parts, then project into common space.

The image display device is a means for visualizing the input image(s) and the subsequently processed images. A conventional color monitor in conjunction with a graphic adapter is sufficient to perform this function.

Pseudo band generation using a generalized data compression scheme generates a data compression lookup table once a compression factor is given by the user. These data compression tables can also be generated offline for immediate use.

In the preferred embodiment, a given image follows an eight-bit structure; the user selects only three bits for a given band. A transformation scheme must be provided to perform this fewer-bit mapping to generate a new image. In general, this is an extremely simple procedure.

Once two or more derived bands are generated and fewer-bit transformations are performed, two or three transformed bands are selected for mapping into a color domain using red, green or blue primary colors as optical filters. Thus, two or three images are combined into a color composite. Once this color composite is displayed on a color monitor, it is generally a true or false color image.

The digital image capture component provides a means by which a color image (FIG. 3) is digitally captured. This captured image is equivalent to an additional band over and beyond the original set of images.

The segmenter, depicted in FIG. 6 as either the level 3 processor 22 or the GIS processor 24, provides a means by which a color or a group of colors is isolated as one uniform region. Any conventional segmenter is appropriate for this operation.

The object feature descriptor generator provides a means by which a region is described by a set of feature attributes such as size, shape and location descriptors.

The knowledge base or preset models provide a means by which a physical object is described in terms of a set of rules or set of models. The models can be three-dimensional, full image, and/or partial image or a mixture of models and real world images or a mixture of partial and full images.

Figure 11A:
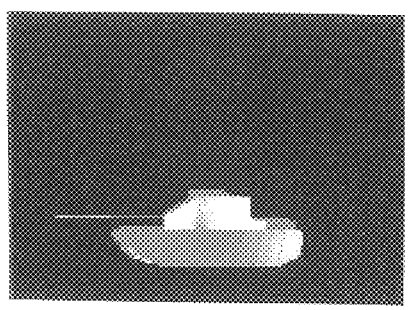
FIGS. 11a and 11b depict range and height libraries, respectively.
Figure 11B:

It is possible to generate images and extract features based on three-dimensional images. Such techniques, in accordance with the present invention, use a dual library to form part or all of the knowledge base 26, which is not based on features. Therefore, it is called a featureless recognition system. For example, the two libraries used in the preferred embodiment relate to range and height, FIGS. 11a and 11b, respectively.

Object recognition is generally achieved by matching an observed (real world) image against a set of preset models (a library). A library can be generated from a set of physical models or a set of wireframe models. A wireframe model of an object can be built from a set of points, lines and surfaces. The result of an orthographic projection of a wireframe model is a boundary contour. A differential orthographic projection, according to a set of maximum range limits, yields a set of depth contours. The difference between two depth contours is called a depth or class interval. In addition to depth contours, a 3-D object can also be described by Fourier descriptors and moments, as discussed by Wang, Gorman and Kuhl (*Remote Sensing Reviews,* Vol. 6, pp. 229–250, 1992.). For object recognition, it is important to know to what extent the classifier relies on the information from the boundary contour alone, versus from the entire set of the depth contours.

The library 26 can also include rules for use in an expert system. The rules available can go far beyond simple specification of properties such as size, tone, shape and texture. They can include spatial relationships between objects. (AN ENGINE IS INSIDE A TANK BODY AND IS ABOVE A TREAD). Special classes which are interdependent collections of two or three other classes may also be defined. (A TANK CONSISTS OF A GUN AND A BODY AND A TREAD.) A wide variety of interactive interrogation is also available. (WHICH TANKS ARE NOT TOUCHING A TREE?)

Figure 7:
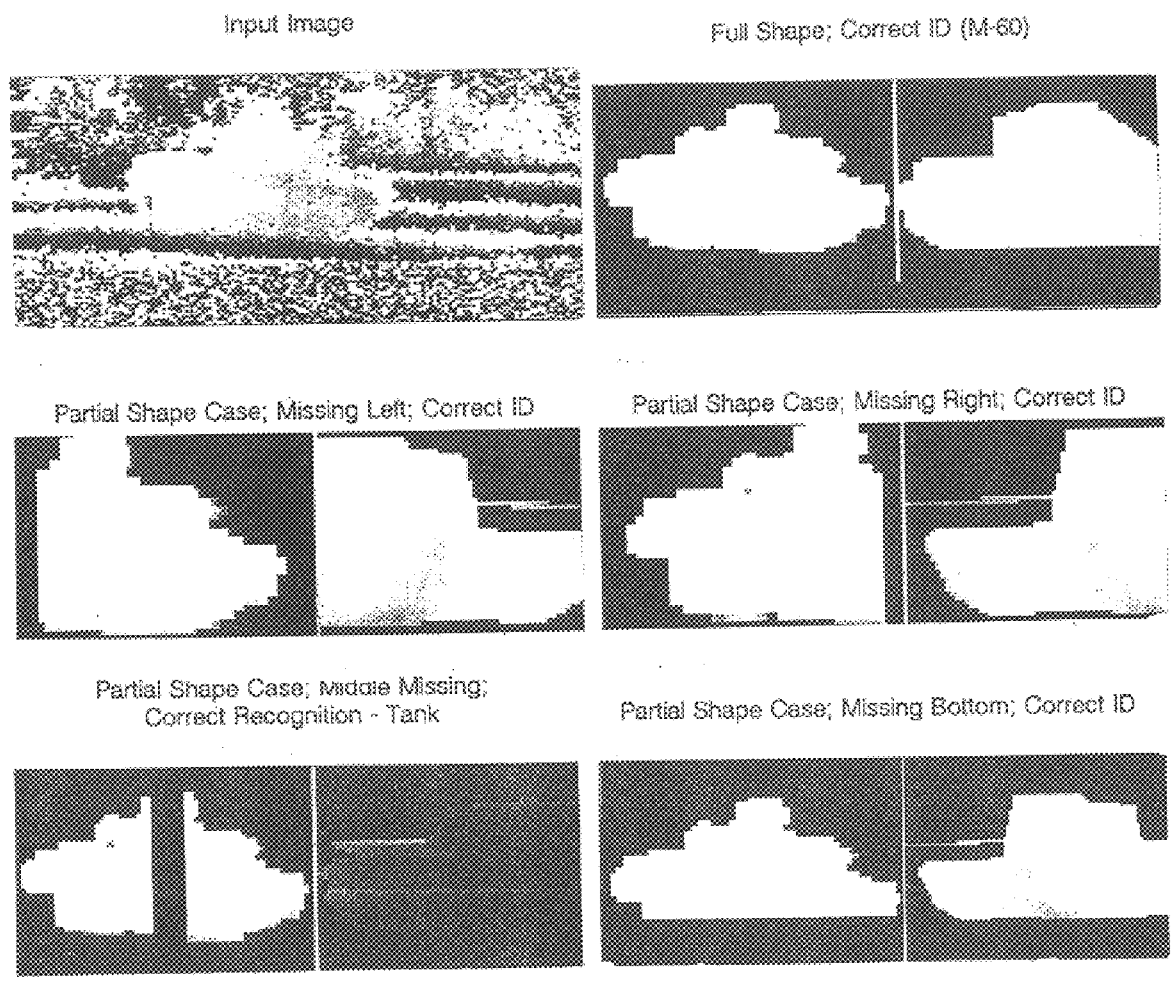
FIG. 7 is a set of updated images in three dimensions (partials)

Referring now also to FIG. 7, in the preferred embodiment, the library 26 is three-dimensional. Not only are objects represented in three dimensions in this library 26, but so too are partial images representative of portions of the objects. Thus, along with the full, three-dimensional image of each object, can be stored a partial image that is cut or cropped up to 30% from the bottom of the image. Likewise, a second partial image represents the full image less up to 30% of the leftmost portion thereof. Finally, a third partial image represents the full image less up to 30% of the rightmost portion thereof. Thus, the full library representation of each object actually consists of four components: the full image representation and three partial image representations.

The library or knowledge base 26 is updatable by the GIS processor 24. The updating procedure occurs when a fraction of real world images (full images or partials) is incorporated into the library 26. The resultant library is a mixture of model-based and real-world images. The matching operation is accomplished by using a modified k-nearest neighbor classifier, as described in Meisel (Computer Oriented Approaches to Pattern Recognition, Academic Press, 1972). Thus, the library can be updated as it is used, and therefore contains a more precise reflection of actual images, the more it is used.

The matcher, which is functionally located between the segmenter (the GIS processor 24) and the knowledge base or library 26, and which can be located physically in either of those components, provides a means by which an observed set of feature attributes or a segmented but featureless image is matched with a given preset model for object recognition.

The present invention has been reduced to practice to result in an ATR/I system capable of performing target identification using LADAR data beyond one kilometer, up to at least 2.2 kilometers. The system superiority comes from a drastically different approach to ATR/I processes from conventional methods.

Figure 10A:
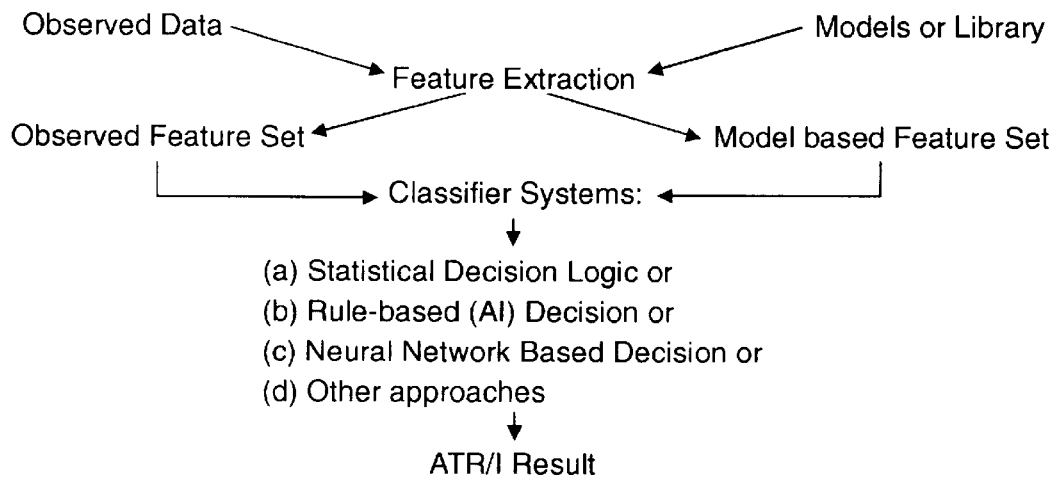
FIGS. 10a and 10b are flow charts of a prior art approach and the approach of the present invention, respectively, to image and library matching techniques in accordance with the system depicted in FIG. 8c.

For the past 20 years, the vast majority of ATR/I efforts have been spent on issues relating to feature extraction, observed feature set, model-based feature set, and classifier systems, shown in FIG. 10a. The underlying assumption has been that only an insignificant difference exists between the model library and observed data. The results have not been encouraging.

Figure 10B:
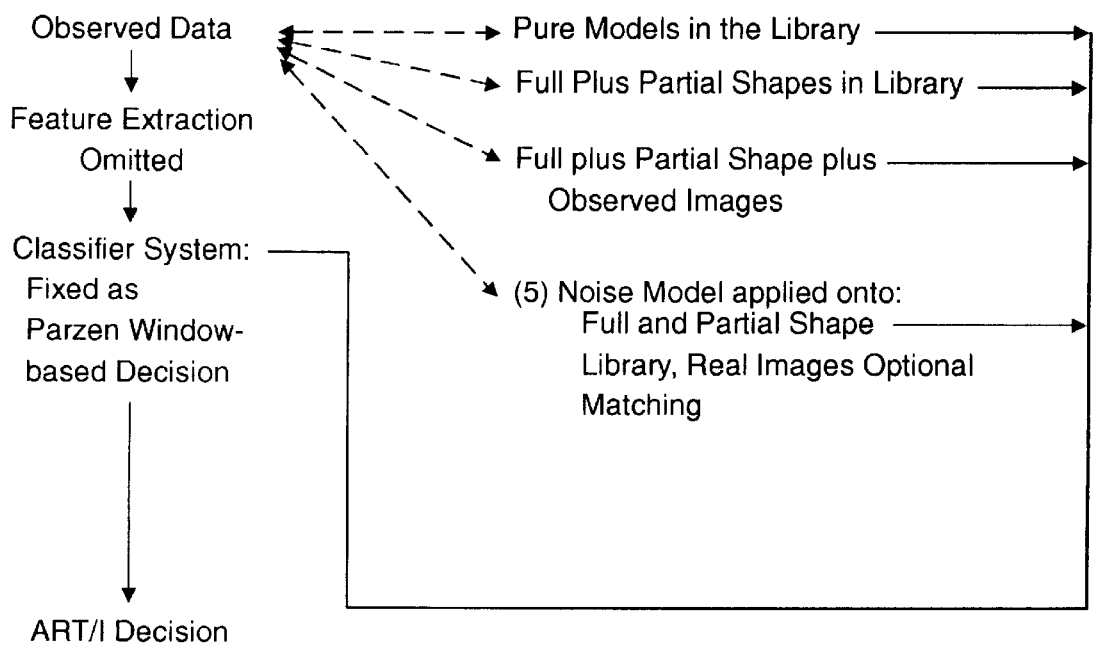

In the past 15 years, however, each of the ATR/I components has been examined in depth, from both theoretical and empirical considerations. As a result, a working ATR/I system is achieved by confronting the complex issue on the relationship between the observed data (FIG. 10b) and the pure models in the library, and by treating the rest of the system components as constants. In other words, the underlying assumption for the present invention is that a significant difference exists between the model library and the observed data.

To recognize or identify the observed target M, the conditional probability P (Ti I M) must be determined for each target or significant clutter i. The posterior probability of Ti given M is defined by the Bayes rule:

$$P(Ti|M)=P(M|Ti)P(Ti)/P(M)$$

$$\alpha P(M|Ti)P(Ti)$$

where P (Ti) is the prior probability of the target or significant clutter, Ti.

To estimate P (M I Ti), a Parzen window density estimation scheme is used. Each target Ti is represented by a set of significant geometric distortions of Ti, TiD={$Ti_d | d \in D$}, where D is a set of all significant geometric distortions caused by viewing angle $\Theta$ and object occlusion o. Each instance of the geometrically distorted target $Ti_d$ is represented by its expected measurement $Mi_d$, where $$M'i_d = Ti_d + N'$$

and N' is the estimated noise component for the distorted target $Ti_d$.

The conditional probability P (M I Ti) can be estimated by $$\Sigma_D(M|M'i_d)/|D|$$

where |D| is the cardinality of set D, i.e., the total number of the component in set D. P (M|M'$i_d$) is normally represented by a Gaussian distribution having mean M'$i_d$ and a proper variance defined based on the number of training sample M$i_d$. The exact form of Parzen window method has been given by Meisel (1972), to which a minor modification has been made in the area of estimating the sigma parameter.

A partial shape library is employed to represent $f(T,\Theta,o)$. For example, the shape library contains a subset of the full shape constructed from varying azimuth and depression angles. For the ground-to-ground case, the azimuth angle is 40°; the depression angle is fixed at 5°. In addition, the shape library contains three partial shape components: 1) each full shape is removed 30% from the bottom; 2) each full shape is removed 30% from the lefthand side; and 3) each full shape is cropped 30% from the righthand side. These partial shape components are added to the full shape library by means of software control rather than by using a manual method.

Through the generation of the distorted target Tid using the wireframe models, the nonlinear distortion function f, and the interaction between the measurements and the geometric distortion parameters $\Theta$ and o can be straightforwardly handled offline during the training phase of algorithm development. In the offline training process, a database of the expected target models are developed for the online target recognition and identification analysis (conditional probability estimation).

The remaining issue is to estimate the measurement result for a distorted target $Ti_d$:

$$M'i_d = Ti_d + N'$$

To determine M'$i_d$, the estimated noise component N' must be determined. Many approaches have been proposed for the estimation of the measurement noise. Codrington and Tenorio (1992) used a Markov Random Field model after Geman and Geman (1984). In this model, noise is a function of the spatial structure of the image. Geman and Geman pointed out the duality between Markov Random Field and Gibbs distributions and employed a MAP estimation paradigm to perform image restoration. The estimation, together with some assumptions about the noise model, resulted in the energy function format. In Codrington and Tenorio, the estimation is conducted by the optimization of an objective energy function consisting of a likelihood term determined by a random noise term and a smoothness term determined by the underlying image structure, which makes a smoother image structure more likely.

The energy function approach is extended to determine the measurement results. The energy function approach has the ability to incorporate many different objective functions into a single cost function to be minimized, as described in Kass, Witkin, and Terzopouloe (1988), Friedland and Rosenfield (1992) and Leclerc (1989).

Creating an energy function framework includes the definition of energy components to perform the appropriate subtasks. A combination of two components is used: the first component attempts to minimize the cost related to boundary contour shape variation; and the second component minimizes the internal image structure of the target. Thus, $$E(x) = w_1 * E_b(x) + w_2 * E_s(x)$$

where $w_1$ and $w_2$ are weights and $E_b(x)$ and $E_s(x)$ are the boundary and structure energy components, respectively; and where x is the image value of the distorted target $Ti_d$. The image value of the best estimated measurement result M'$i_d$ is the value y, which minimizes E(x).

The functional form and the parameters of the energy functions E(x) are determined during the training phase by acquiring a set of measurements of known targets under known geometric distortions. The best function is the function which yields the minimum mean squared error between the estimated values and the true measurements.

Once $w_1$ and $w_2$ are estimated, the Markov Random Field model can be applied to the existing partial shape library to create a more realistic model based shape library (images) to match against the observed LADAR images for ATR/I analysis. A simulation has been conducted using a noise model-based shape library to identify observed LADAR images. This simulation is done simply by adding a sample of observed LADAR images to the wireframe models-based partial shape library. A significant (15%–30%) improvement in correct target identification rate is obtained by replacing the original pure model library with this mixed (observed plus models) library.

The output 28 provides a means by which the result of matching is an output element which can be displayed, stored or input into the segmenter 22, 24 or back to the updated library 26.

The feedback loop 28, 22, 24, 26 provides a means by which the output 28 becomes an input into the segmenter 22, 24 for extracting additional objects.

Figure 8A:
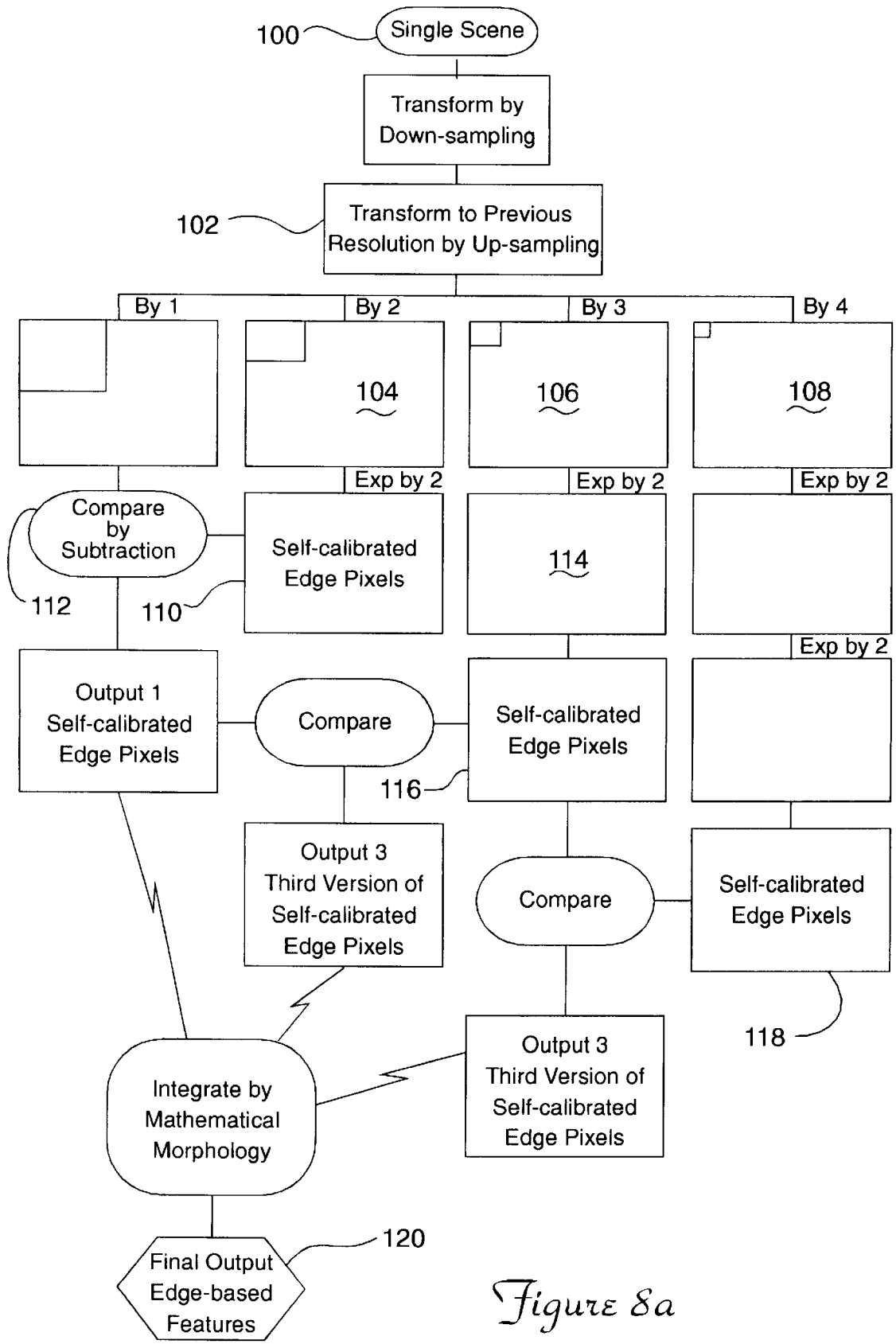
FIGS. 8a and 8b, taken together, are a flow chart of self-determining, self-calibrating, edge-pixel generation and object extraction operations, in accordance with the present invention.
Figure 8B:
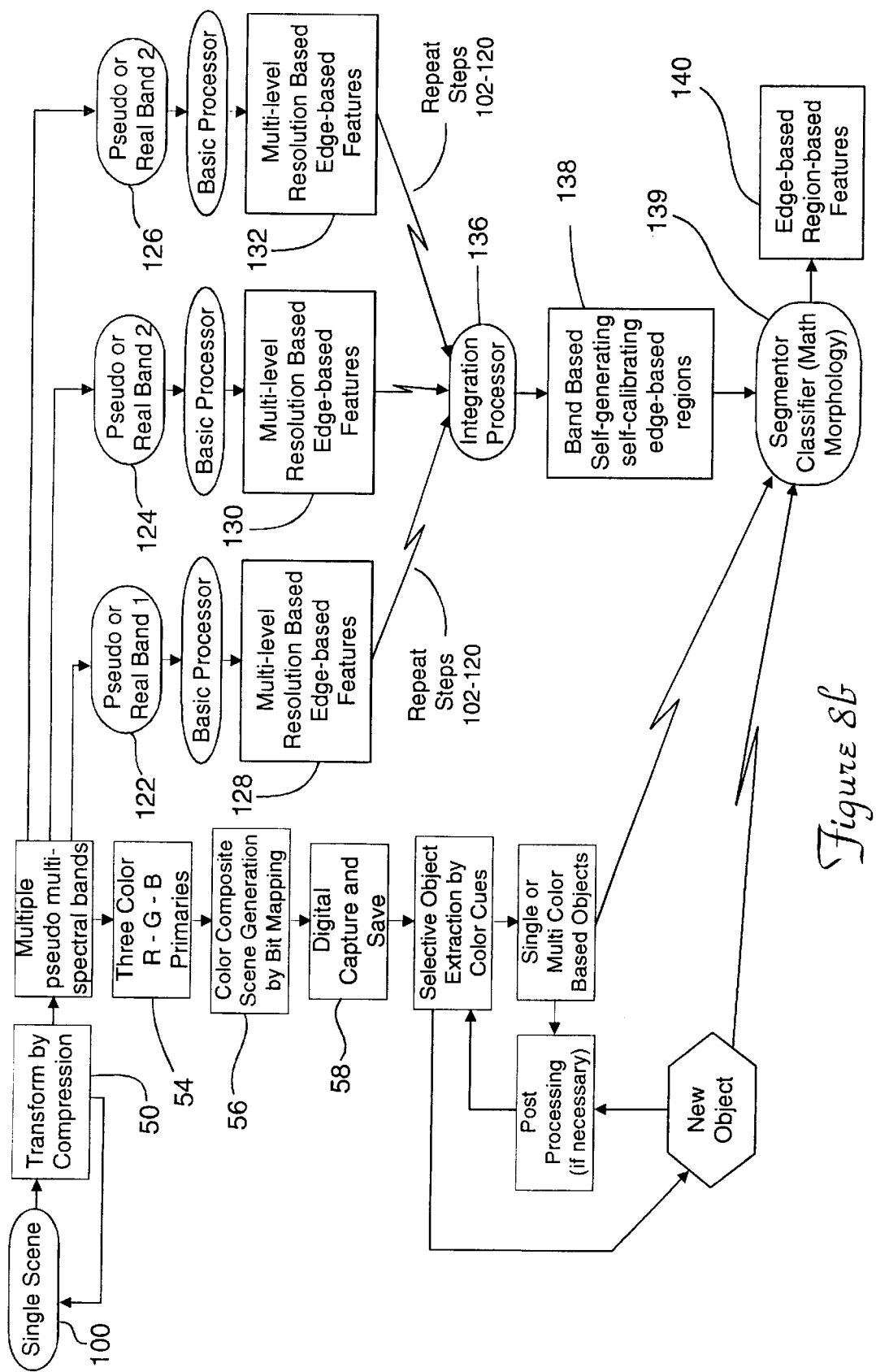
Figure 8C:
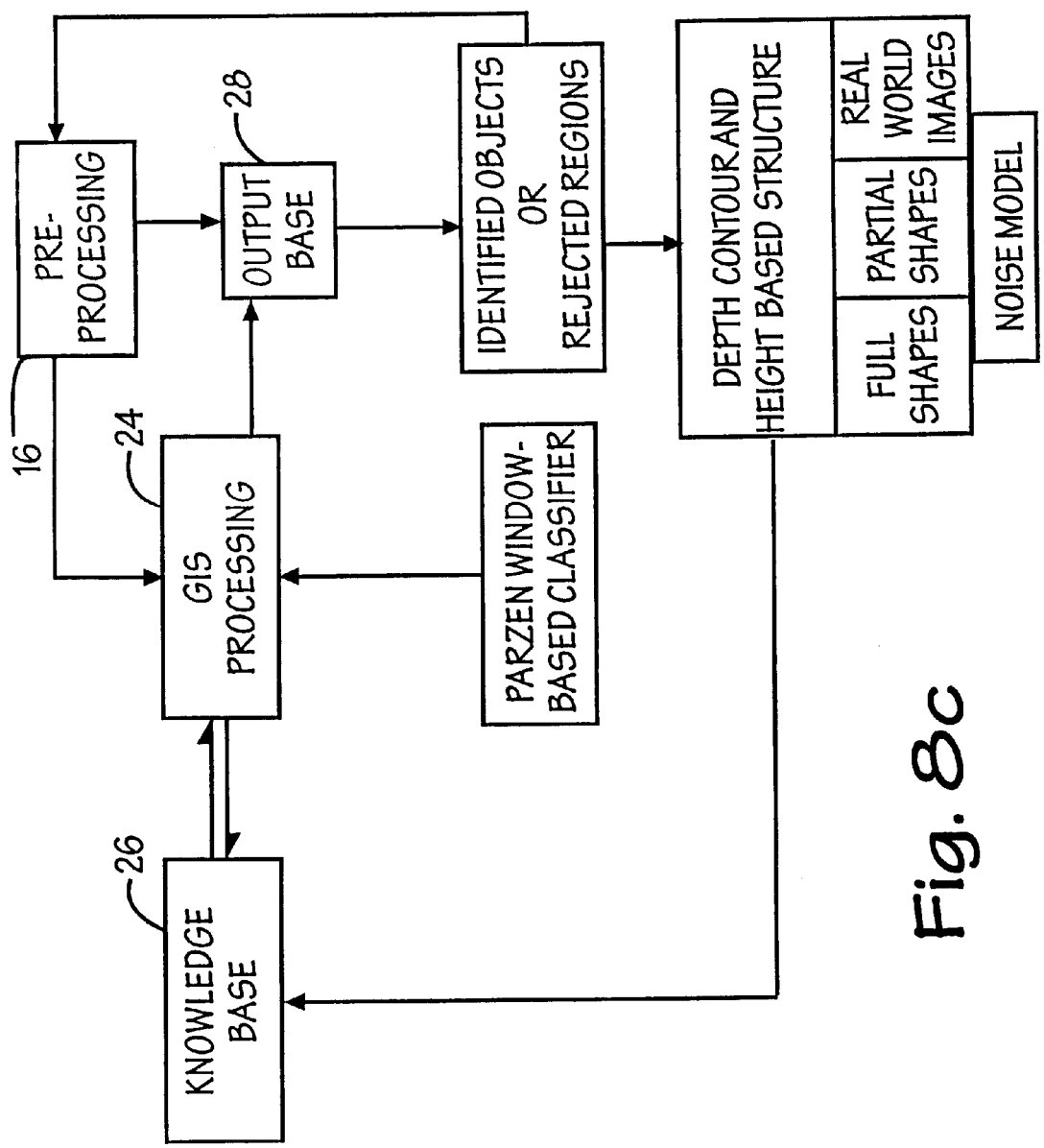
FIG. 8c is a block diagram of the GIS processing system of the present invention showing system architecture and library details.
Figure 8D:
FIG. 8d is an image generated by the process depicted in the processing loop of FIG. 6.

Referring now to FIG. 8a, there is depicted a flow chart for the self-determining/self-calibrating uniform region generator and object extractor.

A single scene is provided, step 100. As described in greater detail in the aforementioned copending patent application, Ser. No. 08/066,691, various information sources can be used as input to a second-generation GIS system. In fact, combined image and map data can be used to represent the image entered into the system.

The system accepts multiple data sources for one common geographical area. The sources can be existing maps, geo-coded, socio-economic data such as census tracts, and various images such as LANDSAT and SPOT satellite imagery. The most common information sources are images and maps.

The single scene generally has well-defined edges and is in the red spectrum. It should be understood, however, that multiple bands for the scene can also be provided. Once the scene has been provided to the system, step 100, down-sampling occurs, step 102. For the first down-sample, step 104, alternate pixels are input to the system. In this way resolution is lowered. Similarly, the image is again down-sampled, step 106, so that every second image pixel from step 104 is input to the system. Finally, the image is again down-sampled, step 108, so that every second image pixel from step 106 is input to the system.

At this point, the image formed by step 104 is expanded back to the original resolution, step 110, by doubling each of the pixels so that the number of pixels in the transformed image is equal to the number of pixels in the original image.

Edge-mapping occurs by subtracting the original image from the image of step 110, which is shown as step 112. Similarly, the image of step 106 is expanded, step 114, and the result is subtracted from the image of step 104, resulting in the image of step 116. Similarly, for the image of step 108, the number of pixels is expanded, compared and subtracted from the image of step 106 to create the image of step 118.

Thus, the image of step 116 can be expanded to the original size merely by successively doubling the number of pixels two times. Similarly, the image of step 118 can be expanded to the original image by successively doubling the number of pixels three times. The expanded images can then be integrated, step 120, to create or define the common edge or edges in the original image. Such integration is accomplished by the use of mathematical morphology procedures, as are well known in the art.

At this point, the scene provided in step 100 can be provided to another band (e.g., near infrared such as 2.0 microns, such as provided by Landsat band 7 of Thematic Mapper). The image processed by such a second band is generated as previously mentioned to provide an integrated edge map, step 120. The two resulting images from step 120 are then merged together in accordance with standard union/intersection principles in a so-called conditional probability technique.

If the scene provided in step 100 is then provided to any pseudo band or any real band, 122, 124, 126, as the new original image 100, then multi-level resolution features are extracted 128, 130, 132, respectively and steps 102–120 are repeated for each band.

All bands are integrated 136 to extract multi-band based, self-generating, self-calibrated, edge-based, feature-less regions, which are applied (step 139) to the GIS processor 24 (FIG. 6), to extract objects 140.

As mentioned above, it is also possible to generate images and extract features based on three-dimensional images, using a dual library which is not based on features.

The majority of image processing techniques assume that input data has 8-bit information (i.e., the intensity range of a pixel is 0 to 255). Beyond this range (e.g., a 12-bit image), specialized processors must be designed to analyze the data, and specialized hardware must be used to display the image. The present invention allows 16-bit data to be processed into a set of 8-bit images. In addition, using LADAR depth data, this 8-bit mode approach provides a reliable environment for segmentation and object identification.

In real world conditions, an object is 3-dimensional. From a given angle, the object is actually only a 2½-dimensional object, because the other half of an object be perceived until it is rotated. Given that an object has 2½-dimensional information, a set of depth contours can be used to present the object; each contour-based plane is perpendicular to the optical axis. The last contour (away from the sensor location) is called the boundary contour. In a 2-D image domain such as obtained from FLIR (forward looking infrared) imagery, the boundary contour is generally referred to as a silhouette.

The principal use of boundary contour is to perform object recognition using shape information. The variables used to describe a given contour are called shape descriptors. Conventionally, researchers use Fourier descriptors and moments as shape descriptors. Another approach is to use a neural network to perform classification analysis by using binary silhouette-based images as input without having to extract feature attributes. While this boundary contour-based method is extremely effective in recognizing airplane types, it is not effective for ground vehicle recognition. For this reason, researchers use depth information to perform object recognition. Laser radar is an appropriate sensor for generating depth information; therefore, the image is called a range image, as oppose to an intensity-based image.

Wang, Gorman and Kuhl (ibid) conducted an experiment using wireframe models of ground vehicles. The experimental results show that using the silhouette information alone, the classifier can achieve a correct recognition rate of ranging from 72 to 78 percent. By adding depth information to the classifier system, an increase of an average rate of three percentage points can be expected if depth moments are used. In a classification analysis using real world LADAR images against a set of wireframe-based ground vehicles, similar results have been obtained regarding the contribution of boundary contour: approximately 75 percent correct classification rate. While a much higher correct identification rate has been achieved using LADAR range images—approximately 95 percent in a 6-vehicle scenario the most important information source is still the boundary contour.

A 16-bit pixel can be reformatted into a set of 8-bit pixels by manipulating an 8-bit number at a time using a shift-right method. For instance, from a 16-bit binary coded data, a number can be generated from the first 8 bits; next, by shifting to the right one bit and using the same 8-bit range, another number can be generated. The final 8-bit number represents the highest 8 bits of the original 16-bit number. This 8-bit shift-right technique is illustrated as follows:

TABLE II

| ID | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| B0 | 0 | - | - | - | - | - | - | I |   |    |    |    |    |    |    |    |
| B1 |   | 1 | - | - | - | - | - | - | I |    |    |    |    |    |    |    |
| B2 |   |   | 2 | - | - | - | - | - | - | I  |    |    |    |    |    |    |

TABLE II-continued

| ID | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| B3 |   |   |   | 3 | - | - | - | - | - | I  |    |    |    |    |    |    |
| B4 |   |   |   |   | 4 | - | - | - | - | -  | I  |    |    |    |    |    |
| B5 |   |   |   |   |   | 5 | - | - | - | -  | -  | I  |    |    |    |    |
| B6 |   |   |   |   |   |   | 6 | - | - | -  | -  | -  | I  |    |    |    |
| B7 |   |   |   |   |   |   |   | 7 | - | -  | -  | -  | -  | I  |    |    |
| B8 |   |   |   |   |   |   |   |   | 8 | -  | -  | -  | -  | -  | I  |    |

In terms of an image, taking 8 bits at a time is similar, in a very general sense, to the down-sampling multi-resolution technique described above. The difference is that using this method, the dimensions of the image remain the same, whereas using a down-sampling approach, the size of the image (i.e., number of pixels) is gradually reduced by a factor of four.

A segment can be used to determine whether an object of certain size and shape is contained in a candidate interval. Then the automatic searching process can be terminated.

From the aforementioned data transformation model, each original 16-bit data item is decomposed into nine reduced resolution numbers: B0 through B8. (In LADAR data structure, a B0-based image is equivalent to the 8-bit LADAR AM channel data, and B8 is close to its FM channel data.) However, empirical data show that the B8-based images have less noise as compared to the corresponding FM image.

The self-determining segmentation method of the present invention assumes that an object has been detected by a FLIR sensor; therefore, the approximate centroid of the object is known. Under this assumption, the intensity value of the object centroid can be obtained. This value now represents the center of the 2½-D object.

The next step is to use a depth interval of "centroid value ±2" to create a binary image using the forming rule set:

any (depth) value within the designated depth interval becomes 1;

any (depth) value outside of the designated depth interval is set to 0. (1)

The final segmentation map is generated by multiplying the B0 image by the B8-derived binary image, or Segmented Image $B0\_Seg = B0 \times B0\_Binary$. (2)

The foregoing ranging method can be set in an automated mode. The process begins with an arbitrary number and a preset class interval. Then the next search is performed on the next interval, which is created by adding a number to the original arbitrary number. For example, the first search interval is set as 11–15 (or 13±2). Then the second search interval is 12–16.

Equation (2), above, is equivalent to using a mask created by the B8 to perform segmentation using the B0 data set. Thus, segmentation of B0 is entirely determined by B8. The generation of the binary is based on a simple thresholding principle, shown as Equation (1), above. Human intervention is minimal.

In general, the image B0_Seg has clutter attached at the bottom and both sides. Additional processing is thus required to create a clutter-free boundary contour. For this, an intelligent segmenter is used which is capable of merging neighboring pixels and subsequently performing region absorption based on size, shape and other criteria.

As a rule, in LADAR images, the edge value between object pixels is much smaller than its counterpart outside of the object. The area outside of the object is generally called the background. Therefore, using a thresholding value of approximately 10 would merge all of the object pixels to form a relatively large uniform region. At this stage, however, some background pixels are still likely to be attached to the object.

Accordingly, the next step is to use an extreme size difference penalty function to merge a relatively small-sized region into a relatively large-sized background. It should be noted that this merge is based on size criterion, not intensity or depth criterion. Since the clutter attached to the object may exhibit itself as multiple layers, this extreme size difference penalty function may have to be performed a number of times.

In certain cases, a small-sized penalty function may have to be performed to merge all small-sized clusters into one region. Since in LADAR images the clutter usually comes from the bottom of the object, this newly-formed region is usually extremely elongated. This is in opposition to the object that is either a square or a rectangle with minimal elongation. Then, the next step is to merge the elongated region with the general background using a shape criterion.

The last step is to merge relatively large-sized background objects with the general background using the same extreme size difference penalty function.

For this post-B0_Seg segmentation analysis to be successful, the approximate distance between the object and the sensor location should be known. This information is needed to set the size parameter for the target, and a range value depending on the orientation of the object. The following program is a sample general penalty function-based segmentation method that is used to generate high-quality boundary contour from LADAR Images.

As noted earlier, an object is recognized only when a match occurs between an observed object (sensor dependent) and an element of a library. In addition, a library element can be represented by a set of descriptors (Fourier or moments, or any variables) or simply a model image without going through an intermediate step of feature extraction.

A means by which a match or no match is determined is generally referred to as a classifier or as classification logic. A simple form of a classifier can be a minimum distance criterion using a simple distance computation formula. However, this minimum distance classifier can be adapted for any feature-based classification system. For example, a Fourier descriptor-based classifier can be executed in a general framework of a minimum distance classifier because the Fourier coefficients can be used to compute a distance from a observed object to an element of a shape library.

A minimum distance classifier is also known as a nearest neighbor classifier because a minimum distance defines the nearest neighbor. If two or more library elements are used to compute the distance from an observed object to a given element in the library, this classifier is generally known as a K-nearest neighbor classifier.

Conventional pattern recognition techniques to perform a matching analysis use a set of features to describe an object. This set of features is then compared to another set of features that describe an element of a library or training set. An alternative to this approach is to match a raw image (instead of the extracted features) to raw models (also without feature extraction) in a library to determine the best match element. This is an innovative approach because heretofore it has not been successful in pattern recognition.

To be successful in using this feature-free method, the models must be prepared in such a way that they are realistic representations of real world objects. In addition, this realistic representation is judged from a visual and graphic point of view, rather than from measurable features. This is a significant departure from conventional approaches to object recognition.

This invention proposes two visual and graphic based representations of an object to perform object recognition. The first model uses depth contours to present a 3-D object. The second model uses structural components arranged by height above the ground to present a general object. The combination of these two models leads to a generalized 3-D representation of an object. For example, in a depth contour-based representation, the Z-axis coincides with the optical axis; whereas in a structural component representation, the Z-axis is approximately perpendicular to the optical axis.

A 3-D object can be constructed from three data files: a point file, a line file and a surface file. A line is constructed from a set of points and a surface is constructed from a set of lines. Furthermore, a surface so constructed is a planar surface.

A depth contour-based model can be constructed by an orthographic projection of the 3-D wireframe model that intersects a set of perpendicular planes. The distance between a pair of planes is called a depth interval. The result of this 3-D representation is analogous to using a set of contour lines to represent a terrain feature, such as a conic hill being represented by a set of concentric circles. Unlike topographic contour lines, pixels having varying greytone values are used in the preferred embodiment to present a 3-D object.

A tank can be conceptualized as an object that has these structural elements: a gun, a turret, a body, a track component and a set of wheels in the track. Using the same wireframe model data files, each structural component can be labeled using a set of surfaces. In addition, the centroid of the structural component can be used to represent the height of the object above the datum, which can be specified by the user.

Following the same projection method, and using the centroid information of each component, a model can be generated of a given object in terms of the spatial arrangement of its structure components. A model can be projected in terms of a set of viewpoints, each of which is obtained from a combination of a specific azimuth angle and a specific depression angle.

The above discussion requires both a range/depth library and a height/structural library to present a 3-D object for matching an observed object that possesses depth information, such as a laser radar image. If the observed object does not have depth information (e.g., a FLIR image), only the height component of the dual library is applicable to a matching analysis. However, this dual library concept is still valid if only the boundary contour is used to represent the depth library component of the system.

To match against elements in a depth contour library, the boundary contour of an observed object in a range image must be extracted first. After the boundary contour is extracted, the original depth-coded pixels are applied to the space enclosed by the boundary contour. The last step is to perform a filtering (e.g., a 3 by 3 median filter) to remove the noise in the range image.

For matching against the height library, the above processed range image must be segmented using an appropriate segmenter to bring out the structure component of the observed object. The segmented range image is rescaled and greytone-coded according to the values of the y-axis of the centroids of all segmented regions. A set of matching examples with this dual library system is shown as FIG. 11$a$, depicting portions of an M60 tank (broadside view) from the height library and as FIG. 11$b$, depicting the same image from the contour library.

Using feature descriptors, researchers generally select a minimum distance classifier to perform the matching analysis. Since this invention proposes the use of a graphically-represented global image as an input and the library component as well, to perform a matching analysis without measurable features, two dissimilar classifiers are proposed. The first is a modified K-nearest neighbor classifier following the work of Meisel (Computer Oriented Approaches to Pattern Recognition, Academic Press, 1972). The second is a standard back propagation neural network. Meisel's work belongs to a general Parzen window methodology for which a major reference is Parzen's work entitled "An Estimation of a Probability Density Function and Mode", *Annals of Mathematical Statistica,* 33, pp. 1056–1076.

While this invention is not a new classifier, per se, two most appropriate classifiers are identified herein that should be an integral part of an object recognition system. The classifiers are unique in two aspects:

1) The use of visual, graphic representation of objects in both the observed component and the library component to perform matching analysis. This innovation eliminates the traditional process of feature extraction, a drastic and significant departure from the traditional pattern recognition paradigm.

2) The use of a dual library, range library and height library, to present a 3-D object.

Conventional pattern recognition systems have the following components:

(1) Input data, (2) Feature extractor, (3) Classifier, (4) Training set or library, and (5) Output.

The present invention replaces the above set of components with:

(1) Input data, (2) Self-determining and self-calibration segmenter, (3) Intelligent segmenter using general penalty functions, (4) Visual and graphic representation of the observed objects and the library models, (5) Designated classifier (not any classifier), (6) Dual 3-D library, (7) Output, and (8) Feedback loop linking the output to the segmenter component.

The present invention can integrate the two aforementioned object generation approaches into one system. Using the system components of the object extractor, multiple bands are generated from a single band image. Inputting these multiple bands into the self-determining/self-calibrating edge-pixel and uniform-region extractor yields multiple sets of regions from the original single scene. These multiple sets of regions provide the basis for extracting objects in the vector processing domain using rule sets and/or image libraries.

With multiple sets of input, a new object (spatial union based) can be defined in terms of the union of multiple individual regions. Using the same principle, a new object (spatial intersection based) can be defined in terms of the intersection portion of multiple individual regions.

Spatial normalization is performed by taking the ratio of pairs between the mesotexture, as described in U.S. Pat. No. 5,274,715, granted to the present inventor, of two adjacent cells in two separate directions as shown in the following example:

Original MTX Matrix mt(1,1) mt(1,2) mt(1,3) mt(1,4)
mt(2,1) mt(2,2) mt(2,3) mt(2,4)
mt(3,1) mt(3,2) mt(3,3) mt(3,4)
mt(4,1) mt(4,2) mt(4,3) mt(4,4)

Row-wider Normalization mt(1,2)/mt(1,1) mt(1,3)/mt(1,2) mt(1,4)/mt(1,3)
mt(2,2)/mt(2,1) mt(2,3)/mt(2,2) mt(2,4)/mt(2,3)
mt(3,2)/mt(3,1) mt(3,3)/mt(3,2) mt(3,4)/mt(3,3)
mt(4,2)/mt(4,1) mt(4,3)/mt(4,2) mt(4,4)/mt(4,3)

Column-wide Normalization mt(2,1)/mt(1,1) mt(2,2)/mt(1,2) mt(2,3)/mt(1,3) mt(2,4)/mt(1,4)
mt(3,1)/mt(2,1) mt(3,2)/mt(2,2) mt(3,3)/mt(2,3) mt(3,4)/mt(2,4)
mt(4,1)/mt(3,1) mt(4,2)/mt(3,2) mt(4,3)/mt(3,3) mt(4,4)/mt(3,4)

Each transformed matrix is called a simple structure because the majority of the background elements are represented by a value close to 1. In addition, cells having values significantly different from 1 most likely contain a "foreign object" or belong to an interface zone.

For ground-to-ground FLIR images, the column-wide simple structure reflects a scene structure composed of the Sky Zone, the Sky/Tree Interface, the Tree Zone, the Tree/Ground Interface, the Ground Zone, and the Ground/Ground Interface. If the airplane rolls while acquiring images, however, the Sky/Tree Interface and the Tree/Ground Interface lines will not be pure east-west straight lines. As a result, the original ground-to-ground simple structure may not match a general air-to-ground scene structure. Therefore, it will not be a good model for predicting target locations using structure as an inference engine.

The proposed isotropic transformation combines both row and column directions into one edge-based index to detect "foreign objects" existing in all directions: horizontal, vertical and diagonal. The specific normalization algorithm is as follows:

$$\gamma(i) = [\Sigma_{j \in N(i)} meso(i)/meso(j)/(\Sigma_{j \in N(j)} I)]$$

where N(i) is the neighboring cell set for the cell i and meso(k) is the mesotexture index for the cell k.

The image understanding (IU) Model #1 has the following specifications:

1) Three Neighboring Interface Rows:
   First Row: Sky/Tree Interface
   Second Row: Tree/Tree Interface
   Third Row: Tree/Tree Interface or Tree/Ground Interface 2) Target Row Detection Principles:
   a) Target row(s) are located at the last Interface Row or on one or two rows below the last of the Triple Interface Rows. Effective Rows are the last two Triple Interface plus two rows below.
   b) If there is no Triple Interface, possible Effective Rows are the Sky/Tree Interface plus four rows.
   c) The column-wide SOS (sum of squares) Ratio Difference can be used to find the Target Row: Usually, the maximum or last of the three very large SSRD (sum of suares of ratio differences) values is/are linked to the Tree/Ground Interface.

3) Target Column Detection Principles
   a) Row-wide SSRD global maximum or local maximum is the target column.
   b) Local cluster of maxima with a 2 by 2 cell is a potential target location. Search is limited to Effective Rows.

4) Miscellaneous Universal Rules, applicable to all models:
   a) Mesotexture maxima Effective Rows are restricted global maxima.
   b) Mesotexture maxima row/column coincidence are target locations.
   c) Mesotexture first Rank row/column coincidence are target locations.
   d) Row and Column-wide Minimum pairwise ranked correlation are target column or rows.

Accordingly, once the two simple structures are replaced by a isotropic normalization derived interface values, the above-described scene structure and its associated target detection rules are invalid.

Beyond simple operations of union and/or intersection, objects can be generated having a spatial base between the region of union and the region of intersection. Once edge-based and region-based objects are generated, information integration can be performed at a higher level (an object level) as opposed to a pixel level. The vehicle used for performing this process is the IMaG system described in copending application, Ser. No. 08/066,691.

After the detection of the scene structure and content, geometric evidence can be extracted from the detected scene structure and regions. The geometric evidence for each cell can be defined as it is "inside tree region", "outside tree region", "inside sky region", "outside sky region", "inside road region", "outside road region", "inside ground region", "outside ground region", "nearby tree-ground region", "nearby sky-ground region", etc. The evidence can be defined as fuzzy membership functions. Fuzzy memberships are defined for: "inside tree region and outside tree region." To determine the fuzzy membership, the shortest distance between the cell of interest and the tree boundary is measured. When the distance is small, the "inside tree region" evidence has a higher value, and the "outside tree region" has a lower value. As the distance increases, the confidence value of the "inside tree revion" is progressively decreased and the confidence value of the "outside tree region" is progressively increased.

A geometric reasoning process is to be applied to each detected potential target. The reasoning process integrates the potential target probability with the geometric evidence derived from the scene structure and content. A probability reasoning approach based on the Bayes Belief Network paradigm is used to perform this multi-source information integration. The input information is integrated and updated through Bayes rules rather than the ad hoc method. For example, each node has a vector of input conditions and a vector of output conditions. The mapping between the input conditions and the output conditions is through a conditional probability (CP) matrix. The CP matrix encodes the relationship between the input and the output conditions. Prior probabilities can be assigned to the output conditions of each node. The belief of a node is the probability of the output conditions in the node. The belief is updated incremental as new evidence is gathered.

As an example, a Bayes network configured as a tree structure can be used for target detection application. A root node name "detection node" is used to make the final target vs. clutter decision. The probability of the potential target derived from the ratio image map is used as a prior probability of the root node. The root node is supported by five evidence nodes: a sky node, a tree node, a ground node, a road node, and a tree-ground node. Each of these nodes provides one aspect of the geometric evidence. The input conditions of the sky node are "inside sky region" and "outside sky region" which can be determined from the fuzzy membership functions described above if sky regions exist. The output conditions of the sky node are "target confirm" and "target reject" which provides contextual information to support the target detection decision. The relationship between the "inside sky region", "outside sky region" conditions and the "target confirm" and "target reject" conditions are encoded in a 2 by 2 CP matrix with the following elements:

| I | P | inside sky region target confirm | I | P | inside sky region target reject | I | I |
| I | P | outside sky region target confirm | I | P | outside sky region target reject | I | I |

The conditional probability elements can be determined by human expert or by an off-line training process. For example, it is obvious that if the ground target is confirmed it is unlikely to be inside sky region. Therefore, we will assign a very small value to P(inside sky region I target confirm). The principles of the operations for the other evidence are similar to the sky node.

The relationship between the "target confirm" and "target region" conditions and the "target" or "clutter" conditions are converted to evidence of target vs. clutter decision. This evidence along the prior target probability will be used to generate the output target vs. clutter decision.

The output of the network is a probability vector of P(target) and P(clutter)=1−P(target). A detection threshold can be defined in such a way that we call an object "target" if P(target)>detection threshold and call an object "clutter" otherwise. The detection threshold can be set for the detection system based on the criteria defined earlier to achieve the best compromise between the detection sensitivity and the false alarm rate.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A system for segmenting an image and extracting objects and features therefrom, comprising:

a) image preprocessing means for receiving and analyzing information representative of maps, images, data or a combination thereof, said image preprocessing means comprising:
  i) means for retrieving an original image, each pixel of which has a value represented by a predetermined number of bits, n;
  ii) means for transforming said original image into at least two distinct bands, each of said pixels in each of the band-images comprising no more than n bits;
  iii) means for protecting each of said transformed, band-images, into a composite domain; and
  iv) means for creating a composite image from all of said transformed, band-images;
b) main processing means operatively connected to said image preprocessing means, for analyzing preprocessed information in accordance with interrogation rules;
c) a knowledge base, operatively connected to said image processing means, for storing rules and models and for matching analyzed information from said main processing means with said stored models; and
d) means for outputting, operatively connected to said main processing means and to said image preprocessing means, for displaying images and for providing object files to said image preprocessing means.

2. The system for segmenting and extracting in accordance with claim 1, further comprising:
  e) storage means operatively connected to said image preprocessing means and to said main processing means.

3. The system for segmenting and extracting in accordance with claim 1, wherein said knowledge base comprises a dual library for storing information representative of three-dimensional objects.

4. The system for segmenting and extracting in accordance with claim 3, wherein said dual library comprises full and partial images of at least one of said models and up-dated real world images that constitute a mixed library.

5. The system for segmenting and extracting in accordance with claim 4, wherein said image preprocessing means comprises:
  i) level one preprocessing means for vector-to-vector raster converting,
  ii) level two preprocessing means for filtering and transforming, and
  iii) level three preprocessing means for integrating raster- and vector-based segmentation analysis.

6. The system for segmenting and extracting in accordance with claim 5, further comprising:
  e) storage means operatively connected to said image preprocessing means and to said main processing means.

7. The system for segmenting and extracting in accordance with claim 1, wherein said image preprocessing means further comprises:
  v) means for digitizing said composite image, if necessary; and
  vi) means for analyzing regions in said segmented images to identify objects.

8. The system for segmenting and extracting in accordance with claim 1, wherein said image preprocessing means further comprises:
  vii) means for coordinating said composite image with independently-generated information to identify features and objects.

9. The system for segmenting and extracting in accordance with claim 1, wherein said means for transforming comprises means for compressing said original image, each of said bands using a different compression factor or technique.

10. The system for segmenting and extracting in accordance with claim 9, wherein said means for compressing comprises means for extracting the square root of the pixel values.

11. The system for segmenting and extracting in accordance with claim 9, wherein said means for compressing comprises means for extracting the log of the pixel values.

12. The system for segmenting and extracting in accordance with claim 9, wherein said means for compressing comprises means for extracting the double log of the pixel values.

13. The system for segmenting and extracting in accordance with claim 9, wherein said means for compressing comprises means for filtering said pixel values thereof.

14. The system for segmenting and extracting in accordance with claim 1, wherein said means for transforming comprises means for reducing bits and remapping without compression.

15. The system for segmenting and extracting in accordance with claim 7, further comprising:

vii) means for coordinating said composite image with independently-generated information to label each segmented image with a set of interrogation rules.

16. The system for segmenting and extracting in accordance with claim 7, further comprising:

vii) means for coordinating said composite image with independently-generated information to match each segmented image against a predetermined library.

* * * * *